(12) United States Patent
Nyfelt

(10) Patent No.: US 7,180,414 B2
(45) Date of Patent: Feb. 20, 2007

(54) METHOD FOR MONITORING THE MOVEMENTS OF INDIVIDUALS IN AND AROUND BUILDINGS, ROOMS AND THE LIKE, AND DIRECTION TRANSMITTER FOR EXECUTION OF THE METHOD AND OTHER APPLICATIONS

(75) Inventor: Leif Nyfelt, Skövde (SE)

(73) Assignee: Jan Bengtsson, Askim (SE)

( * ) Notice: Subject to any disclaimer, the term of this patent is extended or adjusted under 35 U.S.C. 154(b) by 135 days.

(21) Appl. No.: 10/495,143

(22) PCT Filed: Oct. 29, 2002

(86) PCT No.: PCT/SE02/01967

§ 371 (c)(1),
(2), (4) Date: Oct. 13, 2004

(87) PCT Pub. No.: WO03/040751

PCT Pub. Date: May 15, 2003

(65) Prior Publication Data

US 2005/0035872 A1 Feb. 17, 2005

(30) Foreign Application Priority Data

Nov. 9, 2001  (SE) .................................... 0103727

(51) Int. Cl.
*G08B 1/08* (2006.01)
*H04Q 7/00* (2006.01)
(52) U.S. Cl. .................................. 340/539.13; 345/419
(58) Field of Classification Search ........... 340/539.13, 340/689, 979; 345/419, 473, 475; 701/220, 701/224
See application file for complete search history.

(56) References Cited

U.S. PATENT DOCUMENTS

| | | | |
|---|---|---|---|
| 4,232,451 A | 11/1980 | Thomsen | |
| 4,484,192 A * | 11/1984 | Seitz et al. | 340/995.18 |
| 5,694,533 A * | 12/1997 | Richards et al. | 345/420 |
| 5,920,261 A | 7/1999 | Hughes et al. | |
| 5,955,973 A | 9/1999 | Anderson | |
| 3,789,198 A1 | 1/2003 | Henson et al. | |
| 6,690,370 B2 * | 2/2004 | Ellenby et al. | 345/419 |
| 6,826,509 B2 * | 11/2004 | Crisco et al. | 702/141 |
| 6,834,436 B2 * | 12/2004 | Townsend et al. | 33/512 |
| 6,899,539 B1 * | 5/2005 | Stallman et al. | 434/11 |
| 7,034,678 B2 * | 4/2006 | Burkley et al. | 340/539.13 |

FOREIGN PATENT DOCUMENTS

WO       98/37932       9/1998

* cited by examiner

*Primary Examiner*—John Tweel, Jr.
(74) *Attorney, Agent, or Firm*—Young & Thompson

(57) ABSTRACT

A method of monitoring movements of an individual or object provided with a direction indicator that is adapted to send to a monitoring center from a mechanical or electronic sensor a signal that discloses the direction of the direction indicator so as to enable, together with other signals sent to the monitoring center and disclosing the position of the individual object, which is shown on a display screen in the form of a correctly-turned three-dimensional animated picture. The direction indicator includes an indicating element which is adapted to take essentially the same position regardless of the orientation of the direction indicator. The direction indicator includes sensors for sensing the position of the indicating element and producing a signal that can be sent to a monitoring unit which shows the direction of the individual or object carrying the direction indicator.

3 Claims, 1 Drawing Sheet

METHOD FOR MONITORING THE MOVEMENTS OF INDIVIDUALS IN AND AROUND BUILDINGS, ROOMS AND THE LIKE, AND DIRECTION TRANSMITTER FOR EXECUTION OF THE METHOD AND OTHER APPLICATIONS

The present application is the National Stage of PCT/SE02/01967 filed Oct. 29, 2002, which in turn claims the priority of Swedish Application 0103727-4 filed Nov. 9, 2001.

BACKGROUND OF THE INVENTION

1. Field of the Invention

The present invention relates to a method of monitoring the movements of an individual in and around buildings, rooms, and other spaces, and then particularly to a method of enabling the movements of individuals to be monitored during military or civilian exercises. More particularly, the invention is concerned with indicating the direction in which an individual faces, and to show this direction and also to show the direction in which a weapon that might be carried by the individual is directed. The invention also relates to a direction indicator, which is adapted for use with the inventive method and also with other applications in which such a direction indicator can be used.

2. Description of Related Art

WO 02/075352 A1 teaches a method of the kind mentioned in the introduction, in which each individual carries a passive transponder that includes an individual-unique identity for co-action with an active antenna which is connected, either directly or indirectly, to a monitoring centre for the transfer of signals received from the transponder, and where a plurality of antennas are dispersed in and around said buildings, rooms or the like to be monitored, wherein the signals transferred to the monitoring centre are used to show movements of individuals on a display screen, or monitor, in the form of a three-dimensional animated picture.

National special forces, special police, etc., are trained for battle/special missions in built-up areas. These missions are, in reality, extremely difficult and risky, since an attacker or terrorist may have installed booby traps in the buildings, ships, aircraft or corresponding places in which the missions are carried out. Moreover, these missions or operations are often carried out in the dark. The attack on/or storming of a building, room, or the like, is effected, inter alia, with the assistance of smoke/flash grenades and backup fire. Training of soldiers, police, etc., in respect of such missions, and the study of the behaviour and the movements of said soldiers, police, etc., are extremely difficult. It is important that the leader of the exercise is able to monitor certain behaviours of the individuals taking part in the exercise, for instance the direction in which an individual points his/her weapon during certain moments of the exercise, the direction in which the individual is looking, whether the individual advances into a space, or walks backwards. It is highly essential that the leader of an exercise is able to obtain answers to these questions, and may well be a life or death issue in the case of a real mission.

One problem with this known method is that it has not been possible in an animated display to illustrate in which direction an individual faces, or in which direction the weapon is pointed, owing to the fact that there is no technical equipment that can be used to this end.

A number of different types of direction indicating devices are available. One type of device is a "typical" mechanical needle-equipped compass with which it is possible to read a course/direction in the horizontal plane, although not in the vertical plane. Another type of direction indicating device is an electronic device in which the vertical direction can be shown, in addition to a horizontal direction. These horizontal and vertical directions are shown on a display. One drawback with such electronic compasses, however, is that when spun rapidly through a full revolution several times, the compasses loses their position and direction and must be stopped so as to allow time for calibration.

Another drawback with the types of compass mentioned above is that they cannot be read by some other person or by hardware from long distances. Although it is possible to see the direction of individuals and objects in motion with the aid of radar or GPS, this possibility is based solely on the assumption that said individuals/objects are moving in a forward direction. Radar and GPS, however, provide no possibility of determining the direction in which an individual or an object, e.g., a weapon, faces when the individual/object is stationary.

SUMMARY OF THE INVENTION

Accordingly, an object of the present invention is to avoid these deficiencies associated with present-day direction indicators and to provide a novel direction indicator and also a novel method for showing the direction of an individual or an object in an animated reproduction of a course of events.

The object of the invention is achieved with a method in which an individual or an object is provided with a direction indicator which is adapted to send to a monitoring station or centre from a mechanical or electronic sensor a signal that indicates the direction of the direction indicator which, together with other signals sent to the monitoring station and indicating the position of the individual/the object, shows the individual/the object in the form of a correctly-turned, three-dimensional animated picture on a display screen, and, respectively, with a direction indicator that includes a sensor which is adapted to take essentially the same position regardless of the orientation of the direction indicator, and sensors provided in the direction indicator for sensing the state of the indicator and delivering a signal that can be sent to a monitoring unit such as to show the direction of the individual or the object carrying the direction indicator.

BRIEF DESCRIPTION OF THE DRAWINGS

The invention will now be described with reference to a non-limiting exemplifying embodiment of the invention, and also with reference to the accompanying drawings, in which.

DETAILED DESCRIPTION OF PREFERRED EMBODIMENTS

Figure 1:
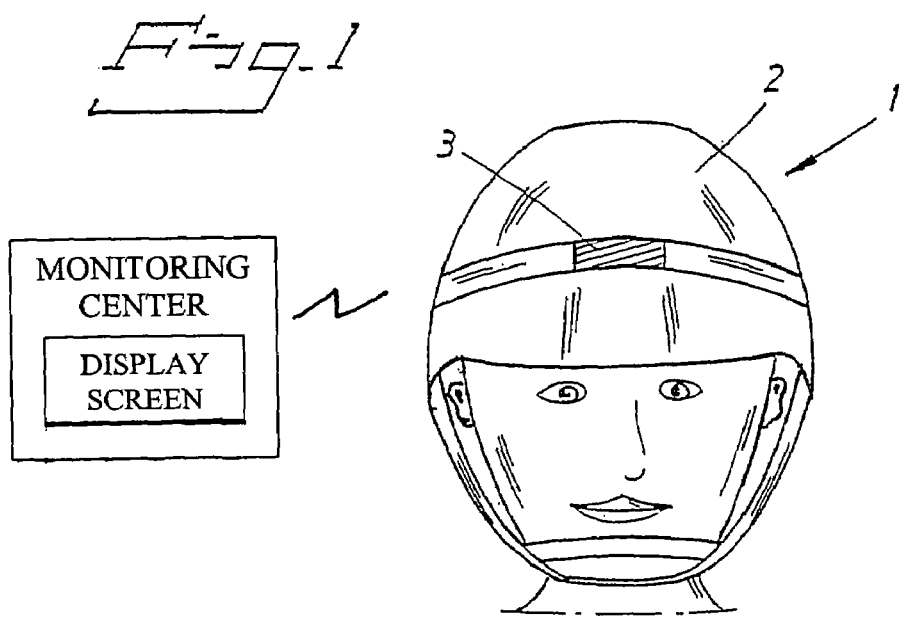
FIG. 1 shows the head of an individual wearing a helmet on which a direction indicator is mounted.

As shown in FIG. 1, an individual 1 equipped with sensors of the kind described in the aforesaid International patent application in order to be able to show movement of the individual on a display screen as said individual moves within an area equipped with antennas for registering the position of said sensors is provided with a helmet 2 on which a direction indicator 3 is mounted in a defined position. In the illustrated case, the direction indicator 3 is attached to the front of the helmet 2, although it will be understood that said indicator may alternatively be placed in other positions, although these positions must be such that the position indicator will turn with the individual's head as the head is turned.

The direction indicator 3 is adapted to detect the direction of the helmet 2, i.e. of the head of the individual 1, and to send this directional information to a receiver placed, e.g., on the individual, or in the monitored space. The receiver is, in turn, in connection with an exercise monitoring centre or station, to which said directional information is sent. Also sent to the monitoring centre is information relating to the current position of the individual, in the manner disclosed in the aforesaid application WO 02/075352 A1. When taken together, this information discloses the position of the individual and his/her direction, which is sufficient to illustrate a correct animated picture of the individual 1 with the aid of an animation program, whereby the individual can be turned in the true direction or in a direction that was earlier true.

With the aid of such a direction indicator and information relating to the movement and direction of other individuals sent to a monitoring centre, it is also possible to animate the view that the individual has seen on each occasion. It is thus possible to play back an occurred sequence of events at a later date, and to see what the individual ought to have seen himself in the animation.

In earlier trials with, e.g., GPS antennas, it has not been possible to show the direction of individuals other than when the individuals are in motion, and only then under the assumption that the individuals move forwards, whereupon there is indicated the direction in which the individuals concerned have advanced. However, this need not be the case, since in reality the individuals may move either sideways or backwards. These directions/movements may, however, be shown correctly with the use of an inventive direction indicator. It is also possible with the aid of the inventive direction indicator to determine the direction in which an individual is looking and then also to estimate or to calculate what the individual should see.

Figure 2:
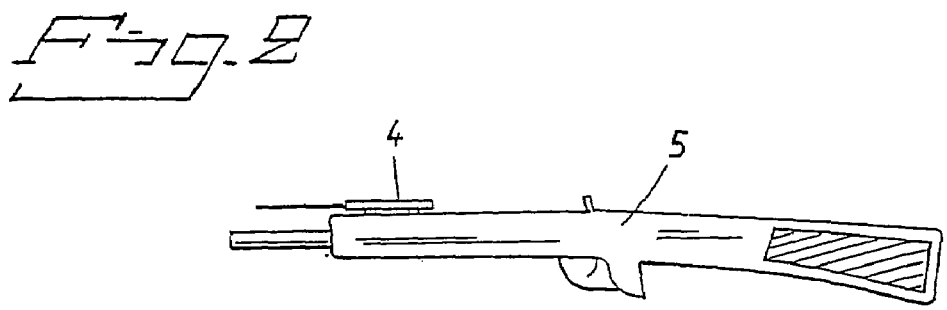
FIG. 2 is a side view of a hand-held weapon on which a direction indicator is mounted.

As before mentioned, a direction indicator 4 of this kind may also be mounted in a corresponding manner on the weapon, e.g., a handheld weapon 5, carried by individuals participating in the exercise, as illustrated in FIG. 2. This enables the manner in which the individual handles his/her weapon 5 to be monitored and, when several individuals participate in an exercise, to check that the individuals present do not aim their weapons at each other, which could result in said individuals firing at each other in a real combat situation.

The direction indicator 3, 4 does not only send information regarding its own direction, but also sends information regarding its own identity, ID, and possibly also the time point of the transmission, unless this time point is recorded centrally in the monitoring system.

In the case of the aforedescribed example, it is primarily conceived that the direction indicator 3, 4 will function to indicate directions in the horizontal plane. It is also possible, however, to arrange direction indicators that indicate directions in the vertical plane, such as to show the direction of individuals 1 and weapons 5 in the animation.

Figure 3:
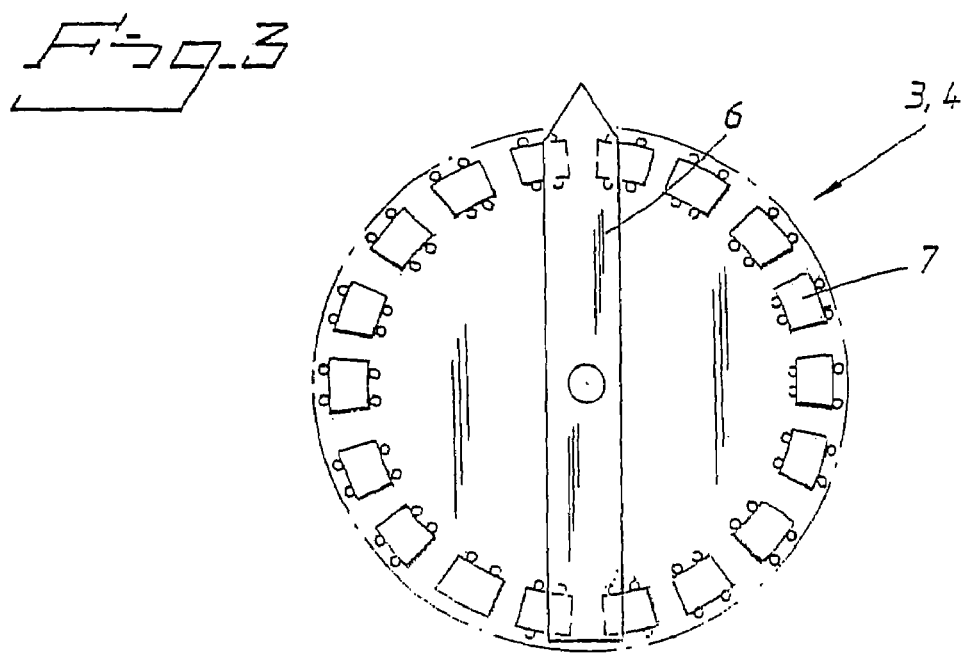
FIG. 3 illustrates schematically the principle according to which an inventive direction indicator may be constructed.

FIG. 3 illustrates an example of a direction indicator 3, 4 designed to transmit directional information in accordance with the invention. In the illustrated case, the indicator 3, 4 is designed to send information relating to direction in the horizontal plane, and consequently has the form of a compass that includes a rotatable compass needle 6. In this case, however, the compass needle 6 is mounted on/over an electronic card which includes sensors 7 that can sense the position of the needle. These sensors 7 may be optical sensors, e.g. photocells or Hall elements. The sensors 7 are positioned in a ring, similar to the markings of a typical compass card, the accuracy of the direction indicator naturally being dependent on the number of sensors 7 present. The compass needle 6 may possibly be provided with a marking or some like means that is sensed by an optical sensor. The sensor 7 on the direction indicator send signals to the electronic card, which includes means for processing the signals and then sending the processed signals to a monitoring centre or station as described above.

For sensing vertical directions, there may be arranged in a manner corresponding to that described with respect to a compass needle a pendulum that includes sensors disposed around the movement path of the pendulum, these sensors functioning to sense the position of the pendulum upon changes in the vertical position and sending this position to a monitoring centre in the form of directional information in a manner corresponding to that described above.

As will be understood, the inventive direction indicator may be used conveniently with, e.g., artillery and tanks in addition to handheld weapons. With the aid of direction and elevation indicators, it is possible to simulate firing and to establish where a simulated shot would have hit by virtue of the given settings, so as to enable feedback to be readily given to the artillerist with regard to the setting of his artillery piece.

It will be obvious that direction indicators of the kind described above can be mounted on objects other than weapons, such as on animals in addition to people. For instance, direction indicators can be mounted on rescue dogs during training operations, so that their movements can be observed more clearly in an animated picture.

An inventive direction indicator may also be used in other connections in which it is desired to monitor, e.g., vehicle or ship movements and positions within limited areas. This may concern, e.g., trucks within an aircraft terminal area, or aircraft located on the airfield. The positions and directions of different vehicles or ships can be given by inventive direction indicators and position indicators provided in said vehicles or ships, said direction indicators and position indicators being in wireless connection with a monitoring centre, therewith enabling said centre to show the position and direction of said vehicles or ships on a display. If the position indicators or other units in the vehicles or the ships also include information relating to the identity of the vehicle or ship, the vehicles or ships may be illustrated graphically in a correct scale on a display, so that, e.g., a flight commander monitoring ground movements is able to see the positions of the various aircraft and also the direction in which they face when stationary. When the aircraft is moving, a conclusion as to the direction of the aircraft can normally be drawn from the direction in which the aircraft moves, although there is no corresponding possibility when the aircraft is stationary.

The invention claimed is:

1. A method of monitoring the movements of an individual (1) in and around buildings, rooms and like spaces, characterised by providing an individual (1) or an object (5) with a direction indicator (3, 4) which is arranged to send a wireless signal to a monitoring centre from a mechanical or electronic sensor (6, 7) which discloses the direction of the direction indicator (3, 4) together with other signals sent to the monitoring centre and disclosing the position of the individual/the object, so as to enable the individual/the object to be disclosed on a display screen in the form of a correctly turned three-dimensional animated picture.

2. A method to claim 1, characterised in that the direction indicator (3, 4) is caused to sense the direction of the individual (1) or the object (5) in a horizontal plane.

3. A method according to claim 1, characterized in that the direction indicator is caused to sense the direction of the individual (1) or the object (5) in a vertical plane.

* * * * *